E. THOMSON.
SPOT WELDING.
APPLICATION FILED MAY 10, 1913.
1,097,895.
Patented May 26, 1914.
2 SHEETS—SHEET 1.
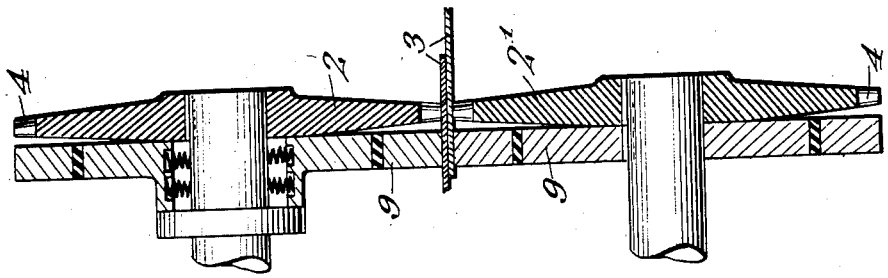
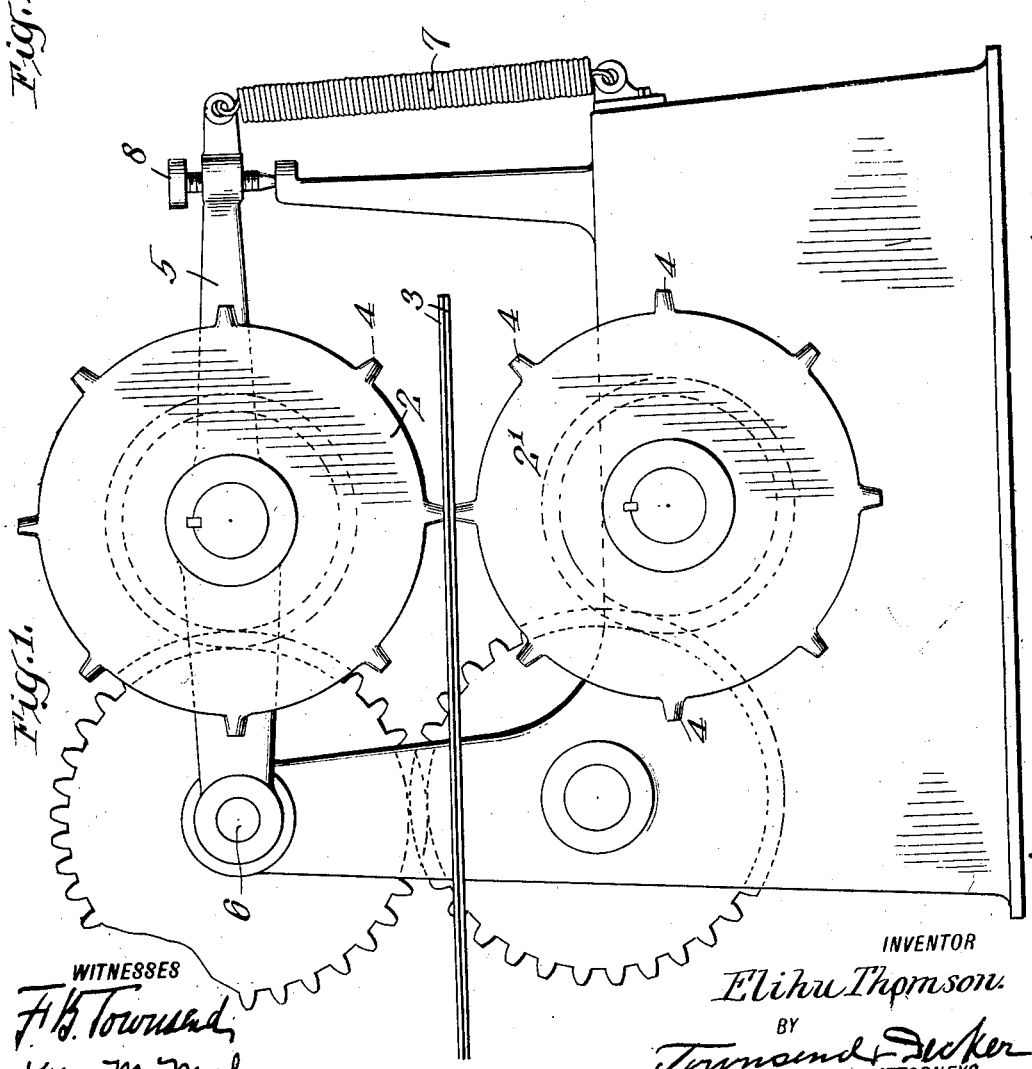
INVENTOR
Elihu Thomson.
BY
Townsend + Decker
ATTORNEYS
WITNESSES
F.B. Townsend
K.M. McMahon E. THOMSON.
SPOT WELDING.
APPLICATION FILED MAY 10, 1913.
1,097,895.
Patented May 26, 1914.
2 SHEETS—SHEET 2.
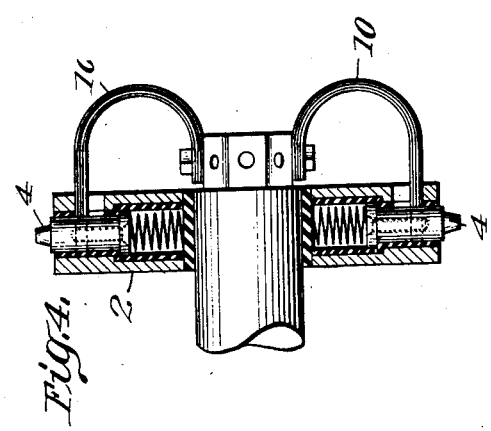
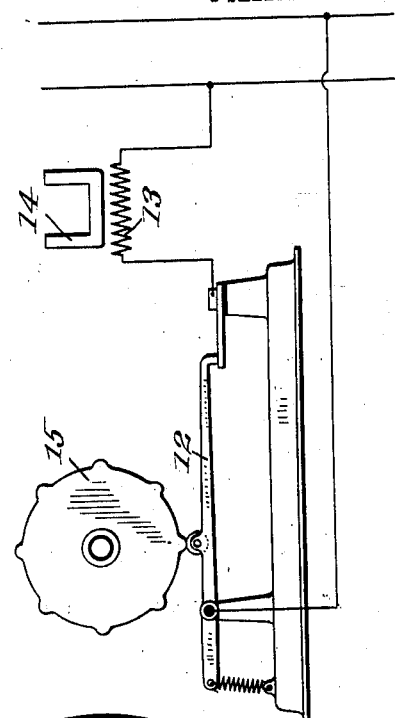
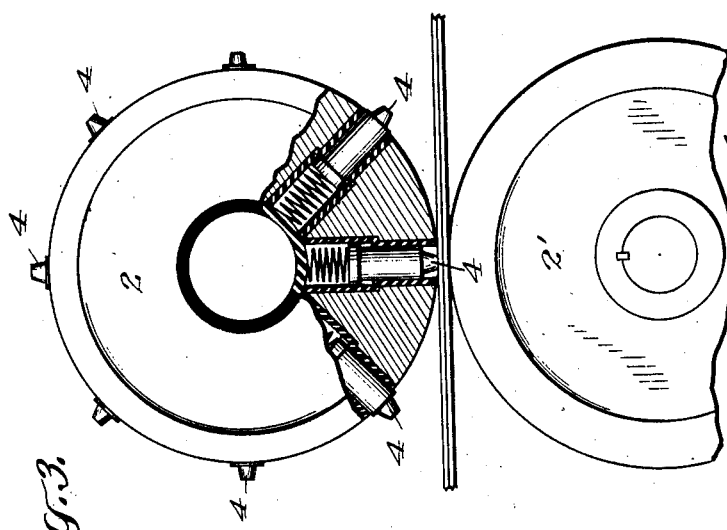
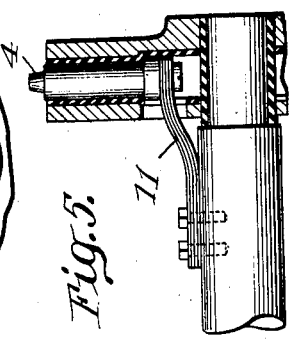
WITNESSES
F. B. Townsend
A. M. McMahon
INVENTOR
Elihu Thomson.
BY
Townsend & Decker
ATTORNEYS

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

SPOT-WELDING.

1,097,895.  Specification of Letters Patent.  Patented May 26, 1914.

Application filed May 10, 1913. Serial No. 766,731.

*To all whom it may concern:*

Be it known that I, ELIHU THOMSON, a citizen of the United States, and a resident of Swampscott, in the county of Essex and State of Massachusetts, have invented certain new and useful Improvements in Spot-Welding, of which the following is a specification.

My invention relates to apparatus for electric spot welding and its object is to provide an apparatus by which work may be rapidly and cheaply conducted by simply feeding the work, such as a pair of sheets of metal to be spot welded, between two wheels, rolls or disks.

In the accompanying drawings Figure 1 is a side elevation of a portion of a welding machine embodying my invention. Fig. 2 is a vertical section through the same.
Fig. 3 is a side elevation showing a modification in the manner of securing the yielding pressure upon the work. Fig. 4 shows a modification in the manner of supplying current to the individual welding electrodes.
Fig. 5 shows a modification in which the current is supplied and the pressure applied through the same spring upon which the electrode is seated. Fig. 6 is a diagram illustrating the manner in which the flow of welding current may be controlled.

2, 2' indicates two large copper rolls or disks arranged edge to edge and mounted on suitable shafts as shown, to permit them to rotate together when the work, as for instance a pair of plates of sheet metal 3, 3 assembled face to face, is passed between them for the purpose of being spot welded in a line of spots.

As shown in the drawings, both wheels are provided with projections 4 which form the welding electrodes for the spot welding operation. It is not necessary for the purpose of my invention that both wheels should be provided with these welding electrodes 4 and they may be omitted from one of them and so that said wheel will present an unbroken periphery to the work. The said electrodes are supplied with the heating current in any desired manner, as for instance, by feeding current to the disks or wheels 3 through their axes or shafts in any desired or proper manner; but as the manner of feeding the current to the welding electrodes which move in the welding operation is well understood in the art, the details of this part of the apparatus are not described.

When both wheels are furnished with the series of welding projections 4, a gearing is provided between them to cause them to rotate at such relative speeds as to bring the welding projections of the two wheels respectively opposite to one another as the wheels turn and as the pair of sheets of metal to be united is fed in between them. This intermediate synchronizing gearing is clearly shown in the side elevation and would of course vary in the ratio of gear according to the relative size of the two wheels.

The yielding or spring pressure applied to the work between the electrodes in the welding operation so that the projections or electrodes will form spot welds to a certain determinate depth of the sheet metal may be furnished in various ways, as for instance by mounting one of said wheels upon a frame or lever upon which a spring acts tending to force the wheels together, or by constructing the individual projections or electrodes 4 as spring-seated electrodes, spring-seated in the periphery of the wheel. In the latter case it is obvious that the wheels may be rigidly mounted.

In the construction shown in Fig. 1 the upper wheel 2 is shown mounted in a frame 5, pivoted at 6 for this purpose and forced yieldingly against the work and toward the opposite wheel by a spring 7, which may be made adjustable if desired. An adjustable stop-screw 8 carried by the frame 5 enables the operator to adjust the welding wheels to and from one another in accordance with the nature of the work or thickness of the sheets to be spot welded. The wheels may be caused to turn or propelled in any desired manner, to bring the welding projections, whether applied to both wheels or to one wheel alone, to successively engage the work.

As will be obvious, the use of the intermediate gearing will be unnecessary if one of the wheels has a plain or unbroken face, that is to say, is not provided with welding projections and is of conducting material throughout. When they are geared together, the propulsion of them may be by means of friction rolls 9 properly applied to roll upon the sheet which is being fed between the wheels for welding, said friction rolls then receiving their power from the forced movement of the work. These friction rolls are preferably mounted on the same shaft with the welding wheels and their peripheries are preferably insulated from the hubs which carry them, as shown, so as to insulate them from the welding wheels. One or both of the feeding rolls is preferably but not necessarily elastically mounted or hung on the shaft, as indicated in Fig. 2 in the case of the upper feed wheel, where springs are shown interposed between the hub and shaft which carries it.

In case the projections are upon one wheel only when, as before stated, the wheels need not run synchronously, it will be only necessary to rotate the disk having the projections and at the same time roll in between the projections and the opposite disk the sheets to be united, by any suitable means, as by means of feeding friction rolls applied to some other part of the work or, if desired, applied adjacently to the welding wheel and driven in any suitable manner.

Fig. 3 shows one of the welding rolls or wheels with a solid or unbroken face, while the other or upper one has the welding electrodes projecting from its periphery. This figure also illustrates the modification in which the electrodes, instead of being solid teeth on the edge of the disk or wheel, are spring-seated plungers mounted in said wheel, so that they individually apply the yielding welding pressure. Said electrodes in this case are seated at their base against spiral springs interposed between the electrode and the hub of the wheel, said electrodes being in the form of pins guided in suitable guides in the material of the wheel. These electrodes mounted as plungers are insulated from the main body of the upper wheel and receive their current from flexible connections 10 extending from the axis carrying said wheel and entering or passing to the plungers through side slots in the wheel, which then becomes merely a carrier.

In the modification illustrated in Fig. 5 the connection to the plungers or electrodes is formed by the plate springs 11 secured at one end to the shaft and at their free ends supporting the plungers as clearly shown, so as to form each a yielding seat for its plunger and at the same time the means for supplying welding current. In this construction as in that shown in Figs. 3 and 4 the wheel is a mere carrier and not a conductor for supplying current to the welding electrodes. It is obvious that in case the wheel be made of conducting material it should be insulated from the shaft so that current may not pass to the work when it is engaged by the periphery of the wheel at portions thereof between the plungers. This construction also makes it unnecessary to employ any special feed disk or roll 9, the wheel or carrier which has the welding electrodes projecting radially from its periphery then being adapted to operate as a feed roll. The necessity of employing special insulation may, however, be obviated by employing a special current controlling device, such for instance as indicated in Fig. 6, and comprising a circuit closing and breaking lever 12 controlling the primary 13 of the transformer, whose secondary 14 furnishes the welding current, and by operating said circuit breaker by means of projections or cam surfaces on a wheel 15 geared to or on the same shaft with the wheel carrying the plunger electrodes and arranging the projections or cam surfaces so that at the moment one of the plungers is down and pressed in, the current will be put on through the plunger, thereby making the weld, current being cut off by the release of the circuit breaker when a weld is effected. As the rolls or wheels continue to revolve, the spot welds are formed successively along the seam or line in which it is required to locate them, through the successive action of the spring-seated or impelled plungers. With this construction, in order to form a lap seam with spot welds, it is only necessary to push the work between the rolls, when they will revolve, it being understood that the rolls or wheels are pressed toward one another or so adjusted that the space between their peripheries will be just sufficient to take the work and that thereby the latter will engage and cause them to rotate by frictional engagement with their peripheries.

The device shown in Fig. 6 may be employed with any of the constructions described and may be adjusted to cause the welding current to flow at the instant when or after the parts of the work are pressed together by the welding electrode and to cut off the current before the welding electrode is disengaged from the work or as soon as the weld is effected and as well understood in the art.

What I claim as my invention is:—

1. In an electric spot welding apparatus, a wheel having welding plungers or electrodes projecting radially from its periphery and seated on current supplying plate springs.

2. In an electric spot welding apparatus, a wheel having spring-seated welding plungers or electrodes projecting radially from the periphery of the wheel.

3. In a spot welding apparatus, a wheel carrying a series of electrodes projecting radially from its periphery and a current controlling wheel rotating synchronously therewith to apply and cut off the welding current synchronously with the engagement of said electrodes with the work.

4. In a spot welding apparatus, a pair of wheels rotating together and one or both provided with a series of projections forming welding electrodes adapted to engage the work at the successive points of spot welding and means insulated from the contact for feeding the material by rolling contact therewith.

5. A spot welding apparatus comprising a pair of wheels and a series of radially projecting electrodes projecting from the periphery of a wheel and engaging the work during its passage between said wheels to form a series of spot welds as and for the purpose described and means insulated from the contact for feeding the material by rolling contact therewith.

6. In a spot welding apparatus, a pair of wheels, each wheel of the pair being provided with radial projections, means for causing the wheels to rotate synchronously with one another and to bring the projections opposite each other as the wheels turn and means insulated from the contact for feeding the material by rolling contact therewith, as and for the purpose described.

7. In a spot welding apparatus, a wheel having a series of spot welding projections upon its periphery and a feed-wheel mounted on the same shaft therewith and having a continuous or unbroken surface between the projections of the welding wheel.

8. In a spot welding machine, the combination with a spot welding wheel having a series of welding projections and a co-axially mounted feed-wheel having its periphery insulated from its hub.

9. In a spot welding machine, a wheel carrying a series of spring-seated plungers projecting radially from the periphery of the wheel as welding electrodes and insulated from the body of the wheel.

10. In a spot welding machine, the combination of a wheel furnished with welding electrodes and a synchronously operating circuit breaker wheel.

11. In a spot welding machine, a wheel provided with welding electrodes insulated from one another.

Signed at Lynn in the county of Essex and State of Massachusetts this first day of May A. D. 1913.

ELIHU THOMSON.

Witnesses:
JOHN A. MCMANUS, Jr.,
HENRY A. ANDERSEN.